United States Patent
DeBray (12)

(10) Patent No.: US 6,442,177 B1
(45) Date of Patent: Aug. 27, 2002

(54) METHOD FOR TRANSMITTING A SERVICE CHANNEL IN A PLESIOCHRONOUS FRAME OF SAID SERVICE CHANNEL AND CORRESPONDING TRANSMISSION SYSTEM

(75) Inventor: Bertrand DeBray, Maisons Laffitte (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/155,424

(22) PCT Filed: Jan. 29, 1998

(86) PCT No.: PCT/FR98/00162

§ 371 (c)(1),
(2), (4) Date: Sep. 29, 1998

(87) PCT Pub. No.: WO98/34361

PCT Pub. Date: Aug. 6, 1998

(30) Foreign Application Priority Data

Jan. 30, 1997 (FR) .............................. 97 00992

(51) Int. Cl.[7] ................................................ H04J 3/07
(52) U.S. Cl. ................................. 370/505; 370/528
(58) Field of Search ............................. 370/503, 505, 370/506, 509, 511, 528, 535, 538, 470, 471, 472, 476

(56) References Cited

U.S. PATENT DOCUMENTS

| | | | | |
|---|---|---|---|---|
| 3,995,120 A | | 11/1976 | Pachynski, Jr. | |
| 4,667,324 A | * | 5/1987 | Graves | 370/102 |
| 5,263,056 A | * | 11/1993 | Urbansky | 375/112 |
| 5,272,703 A | * | 12/1993 | Peters | 370/102 |
| 5,331,671 A | * | 7/1994 | Urbansky | 375/118 |
| 5,644,577 A | * | 7/1997 | Christensen et al. | 370/506 |

FOREIGN PATENT DOCUMENTS

DE    28 14 001 A1    10/1979

* cited by examiner

Primary Examiner—Alpus H. Hsu
Assistant Examiner—Toan Nguyen
(74) Attorney, Agent, or Firm—Sughrue Mion, PLLC

(57) ABSTRACT

A method of inserting a service channel in frames that are plesiochronous relative to the service channel, the method including the steps of transmitting a block clock between a transmitter and a receiver of the frame, and reserving at the transmitter at least one location in the frames for the purpose of conveying the service channel data. The method further includes the steps of: inserting blocks (B) of the service channel into the reserved location causing each of the blocks (B) to be preceded by a predetermined number n1 of identical bits (D) referred to as "start" bits, and to do so in compliance with the following rules: in the event of there being no need to pad out the remainder of the location, repeating the method from the inserting step for a new block (B); in the event of it being necessary to pad out the remainder of the location, causing each of the blocks (B) to be followed by a number n2 of identical bits (F) referred to as "stop" bits, the "stop" bits (F) being different from the start bits (D), and repeating the method from the inserting step for a new block (B); and at the receiver: detecting the regular arrival of the start bits (D) or the regular arrival of the start bits (D) preceded by the stop bits (F), so as to be able to decide that the blocks (B) are present in the reserved locations and to extract the blocks (B) from the reserved locations.

5 Claims, 2 Drawing Sheets

METHOD FOR TRANSMITTING A SERVICE CHANNEL IN A PLESIOCHRONOUS FRAME OF SAID SERVICE CHANNEL AND CORRESPONDING TRANSMISSION SYSTEM

BACKGROUND OF THE INVENTION

The field of the invention is that of transmitting digital data, in particular by radio. More precisely, the present invention relates to a method enabling a service channel to be transmitted in frames that are plesiochronous relative to said service channel, and the invention also relates to a corresponding transmission system.

Two signals are said to be "plesiochronous" when the ratio of their frequencies includes an irrational fractional part. The description below is given in the context of a transmission system, e.g. by microwave beams, in which two types of digital data are conveyed between a transmitter and a receiver. The transmitter and the receiver may either be endpoints of a transmission system, or they may be repeaters installed between such endpoints.

The two types of digital data are as follows: customer data, also referred to as "payload" data, and service data. Customer data makes up a payload channel and is transmitted in a radio frame which is plesiochronous relative to the service channel. By way of example, the payload channel has a data rate of 40 Mbps (megabits per second) while the service channel has a data rate of 64 Kbps.

By way of example, the service channel satisfies CCITT Recommendation G703 concerning clock accuracy and pulse shaping. Conventionally, this service channel contains supervisory data. It can also contain voice data, e.g. from PCM encoding of speech data.

It is known to insert service channel data into reserved locations in the radio frames that serve, outside said reserved locations, to convey the payload data. At the receiver of these radio frames, service channel data is extracted after the frame has been synchronized and in the knowledge of the positions of said reserved locations. However, when the service channel data is made up of blocks of predetermined length (e.g. 8-bit bytes from PCM encoding), it is necessary to provide the receiver with a clock for such blocks (byte clock) in order to enable it to recover the blocks that have been transmitted. Under such circumstances, it is known to transmit the block clock on an auxiliary channel.

The drawback of that solution is that it requires the presence of the auxiliary channel, thereby reducing the performance of the system in terms of transmission efficiency.

SUMMARY OF THE INVENTION

A particular object of the present invention is to mitigate that drawback.

More precisely, an object of the invention is to enable service channel data blocks to be transmitted in radio frames that are plesiochronous relative to said service channel, and in which the block clock that enables the data blocks to be recovered is not transmitted over an auxiliary channel, i.e. in which the block clock can be recovered at the receiver merely by analyzing the frames it receives.

This object, together with others that appear below, is achieved by a method of inserting a service channel in frames that are plesiochronous relative to the service channel, the method consisting also in transmitting a block clock between a transmitter and a receiver of the frame, the method consisting at the transmitter in reserving at least one location in the frame for conveying the data of the service channel.

According to the invention, the method consists in:
at the transmitter:
  i) inserting blocks of the service cannel into the reserved location, causing each of the blocks to be preceded by a predetermined number n1 of identical bits referred to as "start" bits, and do so in compliance with the following rules:
    in the event of there being no need to pad out the remainder of the location, repeating the method at step i for a new block;
    in the event of it being necessary to pad out the remainder of the location, causing each of the blocks to be followed by a number n2 of identical bits referred to as "stop" bits, the stop bits being different from the start bits, and repeating the method from step i for a new block; and
at the receiver:
  detecting the regular arrival of start bits or the regular arrival of start bits preceded by stop bits, so as to be able to decide that blocks are present in the reserved locations and to extract the blocks from the reserved locations.

BRIEF DESCRIPTION OF THE DRAWINGS

The invention is particularly applicable to transmission by radio, and it also provides a transmission system in which the method is implemented.

Other characteristics and advantages of the invention appear on reading the following description of a preferred embodiment, given by way of non-limiting illustration, and from the accompanying drawings, in which.

DETAILED DESCRIPTION OF THE INVENTION

Figure 1:
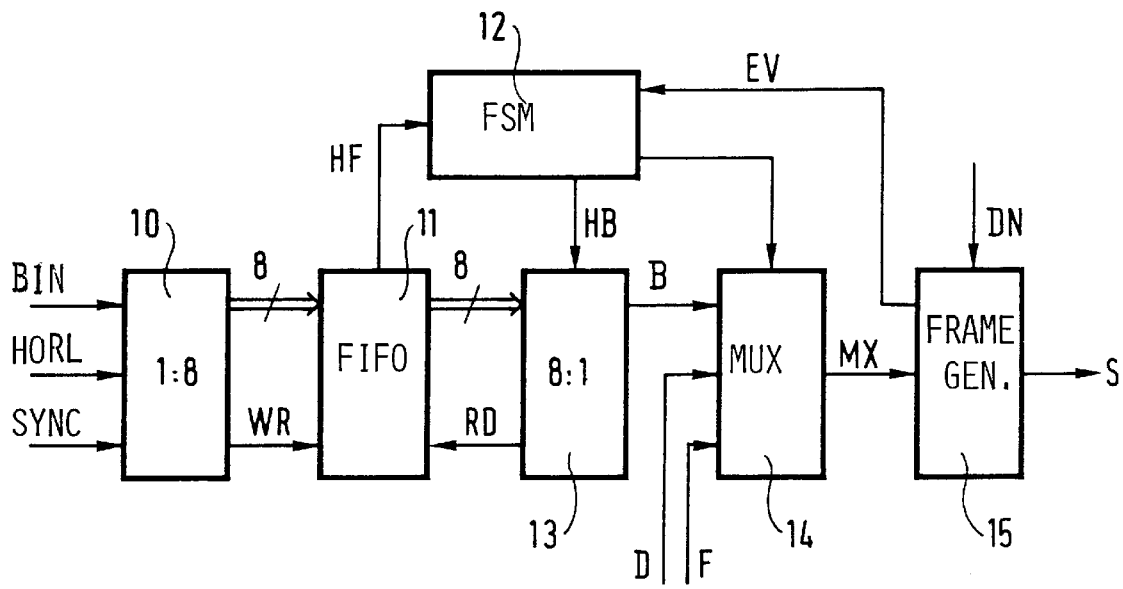
FIG. 1 is a block diagram of a stage for generating radio frames including service channel data blocks inserted in reserved locations of said radio frames.

FIG. 1 is a block diagram of a stage for generating radio frames including service channel data blocks inserted in reserved locations of said radio frames.

The stage of FIG. 1 comprises a serial-to-parallel converter 10 receiving binary data BIN of the service channel to be transmitted, a bit block HORL, and a block clock SYNC. In the description below, it is assumed that the clock SYNC is a byte clock, i.e. that each block comprises eight bits (0 or 1). The converter 10 supplies bytes together with a write instruction WR to a buffer memory 11, e.g. constituted by a first-in-first-out (FIFO) memory. Writing is thus performed in the memory 11 regularly at the rate of the block clock SYNC, since the service channel data arrives at a regular rate HORL. The memory 11 has an output on which it delivers a half-full flag HF indicating whether it is more or less than half full. The flag HF is supplied to a finite state machine 12 which also receives an empty location flag EV from a frame generator module 15. The module 15 receives both the payload data DN to be transmitted and multiplexed data MX coming from a multiplexer 14 controlled by the finite state machine 12. The machine 12 also controls a parallel-to-serial converter 13 which issues a read signal RD to read the bytes stored in the buffer memory 11. The converter 13 is controlled by applying a bit clock HB thereto.

By way of example, the flag HF can be obtained by comparing write and read pointers of the memory 11.

Figure 2:
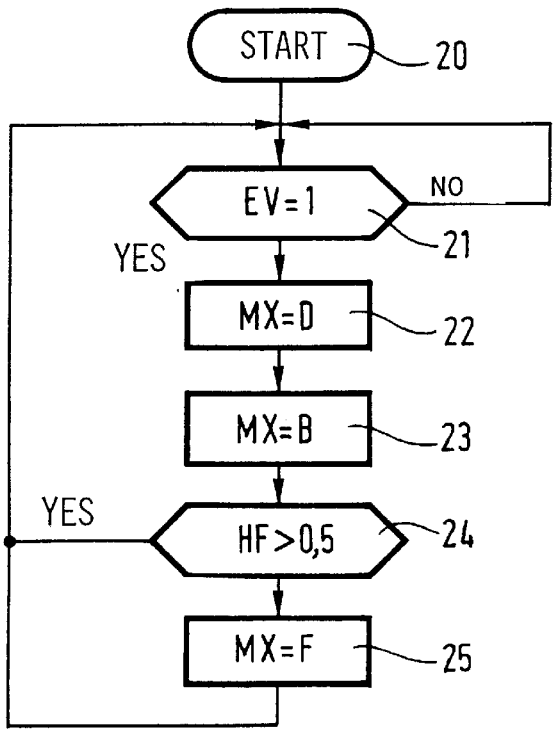
FIG. 2 is a flow chart showing how the stage of FIG. 1 operates.

The operation of this stage is shown in the flow chart of FIG. 2 which is a flow chart showing the operation of the FIG. 1 stage.

Step 20 is a start step. At step 21, it is verified whether the signal EV is flagging the existence of a reserved location in the frame. If not, the test is repeated and the frame generator module 15 supplies payload data DN on its output S. When a reserved location appears (step 22), the frame generator module 15 supplies, on its output, the data MX that has come from the multiplexer 14. At this point, the finite state machine 12 requests the multiplexer 14 to supply the frame generator module 15 with a predetermined number n1 of identical bits referred to as "start" bits. By way of example, the value of n1 may be three. These bits are written D in FIG. 1 and they may all be equal to zero, for example. In parallel, the machine 12 requests the parallel-to-serial converter 13 to issue the instruction RD to read one byte of the service channel in the memory 11. At step 23, these eight bits are applied in series to the multiplexer 14 whose control signal is modified so that these service channel data bits follow immediately after the n1 identical bits.

At step 24, the finite state machine 12 verifies whether the number of bytes stared in the memory 11 exceeds half the total capacity of said memory. If the answer is "yes", then the memory 11 needs to be emptied as quickly as possible and the method returns to step 21. If the answer is "no", then a predetermined number n2 of identical bits referenced F and referred to as "stop" bits, are placed in the frame S by controlling the multiplexer 14. The stop bits F are different from the start bits D: if the start bits D are of value 0, then the stop bits F are of value 1, and vice versa. By way of example, the number n2 may also be equal to three, however the numbers n1 and n2 could be different.

Inserting these stop bits F after a byte B corresponds to a step of padding out the radio frame. This padding depends on how full the memory 11 happens to be, it being recalled that the memory is filled in regular manner. It is this padding that makes it possible to transmit service channel blocks in frames that are plesiochronous relative to the service channel.

After the stop bits F have been inserted, the method returns to step 21.

The method of the invention as implemented in a transmitter thus consists in:
i) inserting service cannel blocks into reserved locations of the radio frames by causing each block to be preceded by n1 identical start bits, while simultaneously complying with the following rules:
if there is no need to pad out the remaining locations, repeating the method at step i for a new block; or
if it is necessary to pad out remaining locations, causing each of the blocks to be followed by n2 stop bits and repeating the method at step i for a new block.

Each frame S from the frame generator module 15 is applied to means for transmitting the frames for the attention of a receiver.

The data rate corresponding to the reserved locations in the radio frames must be $(8+n1)/8$ times greater than the data rate of the service channel to be inserted. When the transmitted blocks are not 8-bit bytes, the value 8 should be replaced by the number of bits in each block. The reserved locations are sufficiently numerous to avoid the buffer memory 11 overflowing.

Figure 3:
FIG. 3 shows the succession of multiplexed bits MX that is to be inserted in the frames transmitted in accordance with the invention.

FIG. 3 shows the succession of multiplexed bits MX for insertion in the transmitted frames.

In this figure, the fields D correspond to one or more start bits, the fields B to service channel data blocks, and the fields F to one or more stop bits. It can be seen that each block B is preceded by one or more start bits, and that stop bits are inserted optionally after the blocks as a function of the amount of padding required.

As explained below, the regular arrival of start bits or the regular arrival of start bits preceded by stop bits is detected in the receiver of the frames S in order to be able to decide that service channel blocks are present in the received frames, and to extract said blocks.

Figure 4:
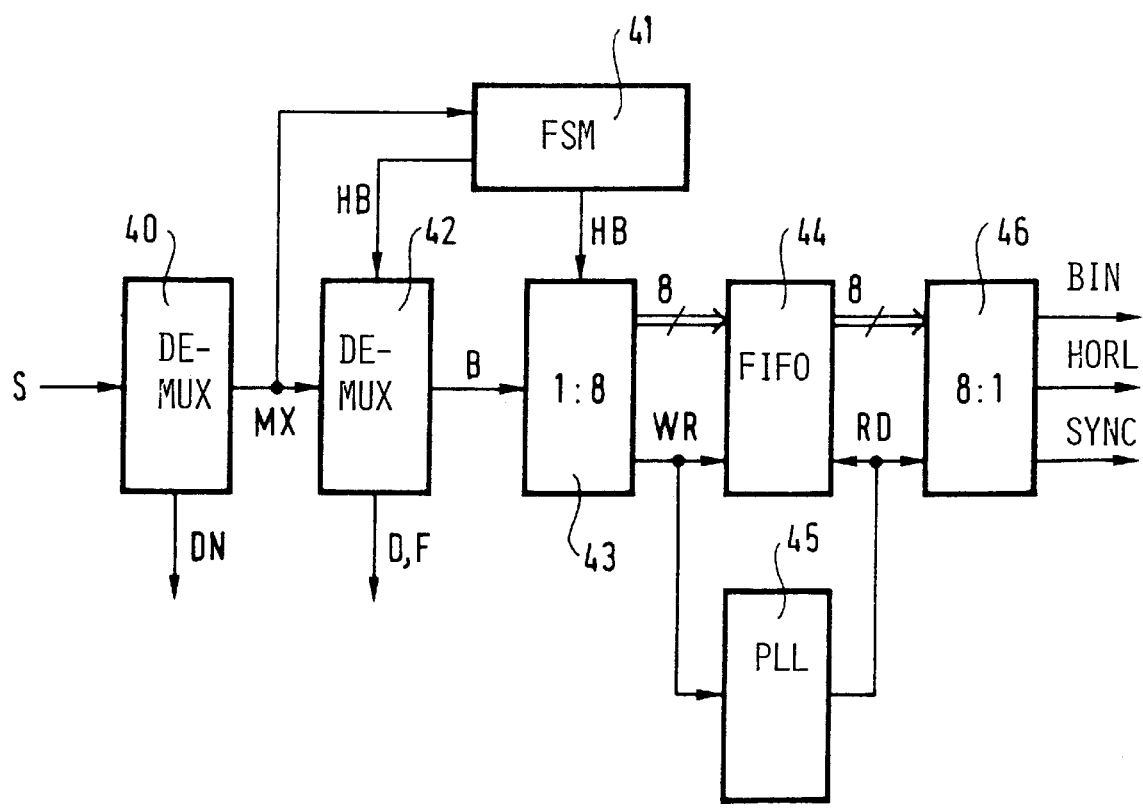
FIG. 4 is a block diagram of a stage enabling said service channel data blocks to be recovered from the radio frames.

FIG. 4 is a block diagram of a stage enabling these service channel data blocks to be recovered from the radio frames. Such a stage is provided in the receiver of the frames S.

After demodulating the received signal, each frame S is applied to a demultiplexer 40 separating out the payload data DN on one path and the multiplexed data MX on another path, which data comprises the service channel data multiplexed with start bits and possible stop bits. The demultiplexing is performed by knowing the positions of the reserved locations after synchronization has been achieved on the received frame (with the help of a frame locking word). The digital data MX from the reserved locations is applied in particular to a finite state machine 41 whose main function is to detect the regular arrival of start bits or the regular arrival of start bits preceded by stop bits, so as to be able to decide that blocks are present in the reserved locations and to extract said blocks from the reserved locations. For this purpose, the finite state machine 41 verifies that sequences similar to those of FIG. 3 occur consecutively for some number n of times. More precisely, it is verified that n1 start bits occur at regular intervals (one-byte separations) for n consecutive times, or else if the n1 start bits are not detected at the expected locations, it is verified that there are n2 stop bits immediately followed by n1 start bits. If n1 and n2 are odd numbers, detection can be performed by majority voting. If n1 and n2 are even numbers and if the number of detected 1s is equal to the number of detected 0s, it is decided that start bits are present and not stop bits. When the above test is true n times over for the same synchronization reference, i.e. without shifting the observation time intervals by a bit time, it is decided that service channel data blocks are present and these blocks can then be extracted from the signal MX.

The finite state machine 14 then generates a bit clock signal HE which is applied to a second demultiplexer 42 which also receives the data MX, this demultiplexer 42 extracting the bytes of the service channel bit by bit. The start bits D and the stop bits F are discarded. The bit clock HS divided by 8 constitutes a byte clock H8 which is applied to a serial-to-parallel converter 43. The converter 43 supplies the received bytes together with a write instruction WR to a buffer memory 44, e.g. constituted by a FIFO memory. The write instruction WR is at the same frequency as the byte clock H8 but is irregular in time since it is available only when service channel bytes have been identified. In order to make it possible to read the buffer memory in regular manner, a phase locked loop (PLL) 45 is provided for generating a regular clock signal RD based on the signal WR.

One such PLL is described, for example, in French patent application No. 96/05496 filed on May 2, 1996. In that patent application, the PLL is of the digital type and supplies a "recovered" clock signal from a "punctured" reference clock signal having missing transitions and of frequency $F_{ref}$. The PLL comprises:

a first divide-by-M frequency divider receiving the punctured clock and delivering a signal of frequency $F_{ref}/M$;

a two-input phase comparator, having one of its inputs receiving the signal of frequency $F_{ref}/M$, and its other input receiving the signal output by a second divide-by-M frequency divider, the phase comparator supplying a phase error signal;

a divide-by-K frequency divider dividing a local oscillator signal of frequency $F_{OL}$, receiving the phase error signal as its control signal, and supplying a signal of frequency $F_k$;

an adder-accumulator receiving the local oscillator signal of frequency $F_{OL}$ and supplying an output signal of frequency $F_0$ equal to $F_{OL}*p/q$ where p/q is the division ratio of the adder-accumulator;

a mixer receiving the signal of frequency $F_k$ and the signal of frequency $F_0$, the mixer supplying a signal of frequency $F_n$ equal to $F_0-F_k$; and a divide-by-N frequency divider synchronized by $F_{OL}$, receiving the signal of frequency $F_n$, and supplying the recovered clock to the second divide-by-M frequency divider.

Naturally, other phase-locked loops can be used to generate a regular clock from a clock signal that has missing transitions.

The bytes read from the memory 44 are then applied to a parallel-to-serial converter 46 restoring the transmitted bits BIN, the bit clock HORL, and the byte clock SYNC.

The invention thus makes it possible to insert service channel blocks in radio frames that are plesiochronous relative to said service channel. The service channel is preferably a voice channel that uses PCM encoding and requires information to be recovered in blocks.

A numerically-worked application is given below:

It is assumed that the bit rate of the frames S is 40 Mbps with each frame having a length of 2048 bits. The binary rate BIN to be inserted is 64 Kbps, and a byte clock is to be recoverable. When the number n1 of start bits is equal to three, the data rate to be inserted in the radio frames is thus 64,000*(8+3)/8, i.e. 88 Kbps. Each frame must therefore include 2048*88/40,000=4.5, i.e. 5 (rounding up to the next integer) locations available for inserting the service channel bits BIN and the start bits. It can be seen at this point that the bits constituting a byte are transmitted in consecutive frames.

Naturally, the present invention is not limited to transmitting data by radio, and it can also be applied to transmission by optical fiber or by cable.

What is claimed is:

1. A method of inserting a service channel in a frame that is plesiochronous relative to said service channel, said method comprising also transmitting a block clock between a transmitter and a receiver of said frame, said method comprising, at said transmitter, reserving at least one location in said frame for conveying the data of said service channel, the method being characterized in that it further comprises:

at said transmitter:

inserting blocks (B) of said service channel into said reserved location causing each of said blocks (B) to be preceded by a predetermined number n1 of identical bits (D) referred to as "start" bits, and to do so in compliance with the following rules:

in the event of there being no need to pad out the remainder of the location, repeating said from said inserting step for a new block (B);

in the event of it being necessary to pad out the remainder of the location, causing each of said blocks (B) to be followed by a number n2 of identical bits (F) referred to as "stop" bits, said "stop" bits (F) being different from said start bits (D), and repeating said method from said inserting step for a new block (B); and at said receiver:

detecting the regular arrival of said start bits (D) or the regular arrival of said start bits (D) preceded by said stop bits (F), so as to be able to decide that said blocks (B) are present in said reserved locations and to extract said blocks (B) from said reserved locations.

2. A method according to claim 1, characterized in that said frame is a radio frame.

3. A method according to claim 1, characterized in that said blocks (B) are bytes.

4. A system of transmitting a frame and a service channel that is plesiochronous relative to said frame, said system also transmitting a block clock between a transmitter and a receiver of said frame, said block clock making it possible to extract blocks of said service channel from said frame, the system being characterized in that it comprises:

at said transmitter:

means (15) for inserting blocks (B) of said service channel into reserved locations of said frame; and means (14, 15) for inserting a predetermined number n1 of identical bits (D) referred to as "start" bits before each of said blocks (B), an inserted block (B) being followed either by n1 further start bits (D) in the event of there being no need to pad out the remainder of the location, or else by a number n2 of identical bits (F) referred to as "stop" bits, in the event of it being necessary to pad out the remainder of the location, said stop bits (F) being different from said start bits (D); and at said receiver:

detection means for detecting the regular arrival of said start bits (D) or the regular arrival of said start bits (D) preceded by said stop bits (F), said detection means supplying a bit clock (HORL), a block clock (SYNC), and the data (BIN) of said service channel.

5. A system according to claim 4, characterized in that said frame is a radio frame.

* * * * *